United States Patent
Chateau et al.

[11] Patent Number: 6,086,202
[45] Date of Patent: Jul. 11, 2000

[54] METHOD OF PRODUCING ANGULAR TOLERANCE MARKINGS FOR LENSES FOR CORRECTING ASTIGMATISM, AND ASSOCIATED LENSES

[75] Inventors: Nicolas Chateau, Paris; Richard Legras, Le Plessis Robinson; Dominique Baude, Saint-Ouen, all of France

[73] Assignee: Essilor International (Compagnie Generale d'Optique), Charenton le Pont, France

[21] Appl. No.: 09/287,626

[22] Filed: Apr. 7, 1999

[30] Foreign Application Priority Data

Apr. 7, 1998 [FR] France .................... 98 04291

[51] Int. Cl.$^7$ .................... G02C 7/04; G02C 7/02
[52] U.S. Cl. .................... 351/160 R; 351/160 H; 351/176; 351/177
[58] Field of Search .................... 351/160 R, 160 H, 351/161–167, 176, 177

[56] References Cited

U.S. PATENT DOCUMENTS

| | | | |
|---|---|---|---|
| 4,268,133 | 5/1981 | Fischer et al. | 351/161 |
| 4,310,225 | 1/1982 | Davis | 351/176 |
| 5,062,701 | 11/1991 | Drazba et al. | 351/160 R |
| 5,100,225 | 3/1992 | Rothe | 351/160 H |

FOREIGN PATENT DOCUMENTS

| | | | |
|---|---|---|---|
| 0452549 | 11/1990 | European Pat. Off. | G02C 7/04 |
| 9303409 | 2/1993 | WIPO | G02C 7/04 |

OTHER PUBLICATIONS

Manual Contact lens Practice, 4$^{th}$ edition (1988) "Hydrogel lenses for astigmatism"—pp. 659–679 XP 002087185—pp. 669–677.

*Primary Examiner*—Georgia Epps
*Assistant Examiner*—Jordan M. Schwartz
*Attorney, Agent, or Firm*—Young & Thompson

[57] ABSTRACT

In a method of producing tolerance markings on a contact lens for correcting astigmatism which has a given cylinder, the tolerance markings comprise at least two straight line segments in the peripheral part of the contact lens with an angle $2\alpha_T$ between them. The angle $2\alpha_T$ between the two straight line segments of the tolerance markings depends on the cylinder of the contact lens.

11 Claims, 3 Drawing Sheets

METHOD OF PRODUCING ANGULAR TOLERANCE MARKINGS FOR LENSES FOR CORRECTING ASTIGMATISM, AND ASSOCIATED LENSES

BACKGROUND OF THE INVENTION

1. Field of the invention

The invention concerns contact lenses. It is more particularly concerned with lenses that are not circumferentially symmetrical, such as lenses for correcting astigmatism. To be more precise, it concerns a method of marking angular tolerances to facilitate putting in such lenses.

2. Description of the prior art

Contact lenses for correcting astigmatism have the particular feature that at least one of their faces is not circumferentially symmetrical about the optical axis. Consequently, they must be placed on the eye of the wearer in the correct angular position, failing which the correction of vision is imperfect.

Conventional lenses for correcting astigmatism therefore have symbols in their peripheral part, which has no optical function, enabling the clinician to verify correct orientation of the lens on the eye. These symbols include angular markings for assessing the positioning error and where applicable comparing it to a tolerance with respect to the optimal position of the lens, assuming that this tolerance is known.

The invention is directed to a novel method of producing angular tolerance markings specific to each lens and allowing for the fact that the acceptable angular tolerance depends on the cylinder of the lens. In addition to correcting astigmatism, the lens can incorporate any other type of correction. One objective of the invention is to determine directly whether the angular position of the lens is within the tolerable range or not. Another objective of the invention is to save clinicians time and facilitate their work. The invention can be used on any type of lens for correcting astigmatism, the lens itself constituting another aspect of the invention.

SUMMARY OF THE INVENTION

With the above aims in view, the invention proposes a method of producing tolerance markings on a contact lens for correcting astigmatism which has a given cylinder, wherein the tolerance markings comprise at least two straight line segments in the peripheral part of the contact lens with an angle $2\alpha_T$ between them depending on the cylinder of the contact lens.

In one particular embodiment of the invention, an angle $\alpha_T$ equal to half the angle between the two straight line segments of the tolerance markings satisfies the following equation:

$$\alpha_T = \arcsin\left[\frac{22.15 - \sqrt{(490.6 - P_T)}}{2C}\right]$$

where C is the cylinder expressed in diopters and $P_T$ is a threshold of reduced visual acuity to be complied with, expressed as a percentage and having a value in the range from 10% to 50%.

The law of evolution giving the degradation threshold $P_T$ as a function of the cylinder C to be corrected is preferably represented between two envelope curves defined by the following two equations:

$$P_T = \frac{-11.5}{C} + 34$$

$$P_T = \frac{-14.3}{C} + 42 + 4C$$

In a more specific embodiment of the invention, the law of evolution of the degradation threshold $P_T$ as a function of the cylinder C to be corrected satisfies the following equation:

$$P_T = \frac{-12.7}{C} + 38 + 1.6C$$

The invention is also directed to a contact lens for correcting astigmatism having an optically active central area, at least one surface of which is not circumferentially symmetrical about its optical axis, and a peripheral area in which there are tolerance markings formed by the method as defined hereinabove.

More generally, the invention is directed to a series of lenses each carrying tolerance markings including at least two straight line segments, wherein the angle of the straight line segments varies with the cylinder C to be corrected from one lens to another.

The description and drawing of a preferred embodiment of the invention given hereinafter explain more clearly the aims and advantages of the invention. The description is clearly given by way of example and is not limiting on the invention.

DETAILED DESCRIPTION OF THE PREFERRED EMBODIMENTS

A conventional contact lens for correcting astigmatism has an optically active central area, at least one face of which is not circumferentially symmetrical about its optical axis, and a peripheral area in which angular positioning symbols may be placed.

Incorrect angular orientation in the plane perpendicular to the optical axis when positioning the contact lens on the eye leads to imperfect correction of astigmatism, as already mentioned, manifested in residual astigmatism which reduces visual acuity. The residual astigmatism cylinder, known as the residual cylinder, is proportional to the astigmatism cylinder to be corrected and to the orientation error.

The orientation error (referred to hereinafter as the angular error) degrades visual acuity in proportion to the degree of astigmatism to be corrected. The tolerance to be respected in the orientation of the lens therefore becomes more severe as the cylinder to be corrected increases.

The residual cylinder R can theoretically be expressed as a function of the cylinder C to be corrected and the angular error $\alpha$ by the following equation (see W. A. Douthwaite, Contact Lens optics and design, $2^{nd}$ ed. Butterworth-Heinemann, Oxford 1995):

$$R = 2\, C \sin(\alpha)$$

The reduced visual acuity due to the residual cylinder R, expressed in the form of a positive reduction percentage P, can be modeled in the following form (see C. Fauquier, T. Bonnin, C. Miège, E. Roland, Influence of combined power error and astigmatism on visual acuity, in Vision Science and its Applications, OSA Technical Digest Series 1995, SaE6 (1995)):

$$P = 44.3\, R - R^2$$

where R is in diopters.

It is feasible to tolerate a degraded visual acuity limited to a degradation threshold $P_T$ and it is then possible to determine the limiting angular error $\alpha_T$ of the lens according to the cylinder C to be corrected using an equation derived from the previous two equations:

$$\alpha_T = \arcsin\left[\frac{22.15 - \sqrt{490.6 - P_T}}{2C}\right]$$

where C is expressed in diopters and $P_T$ is expressed as a percentage.

Figure 1:
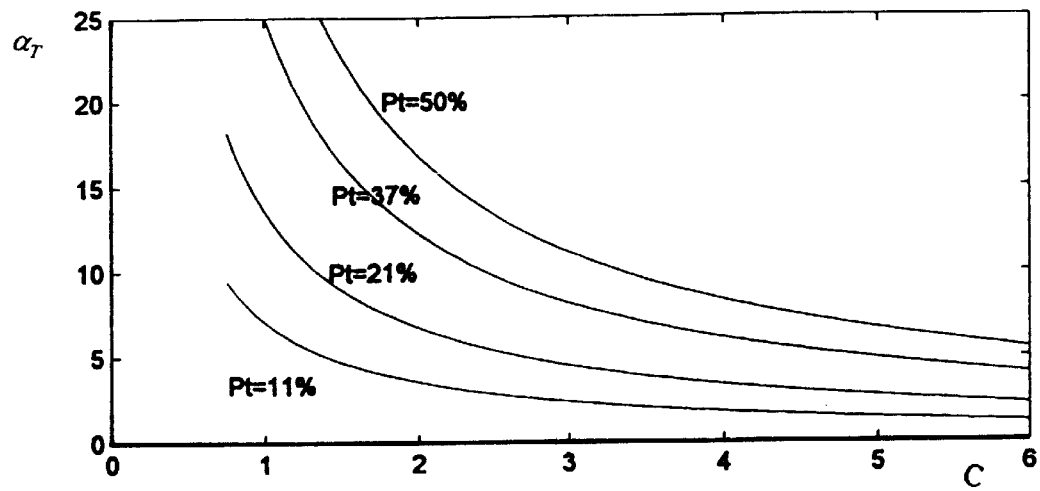
FIG. 1 shows the limiting angular error as a function of the cylinder to be corrected for various fixed degradation thresholds.

The degradation threshold $P_T$ takes a fixed value, for example in the range from 10% to 50%, if it is considered independently of the cylinder to be corrected. FIG. 1 shows the dependence of the limiting angular error $\alpha_T$ as a function of the cylinder C to be corrected for respective degradation threshold $P_T$ values of 11%, 21%, 37% and 50%. The limiting angular error $\alpha_T$ is very small, in the order of a few degrees, for large cylinders (5 diopters and more). A limiting angular error $\alpha_T$ this small is very difficult to comply with and in practice a slightly greater angular error is tolerated for severe astigmatism.

It is therefore possible to use a value of the degradation threshold $P_T$ increasing as a function of the cylinder C to be corrected. In the embodiment of the invention described here by way of non-limiting example, the mathematical law giving the degradation threshold $P_T$ as a function of the cylinder C to be corrected is represented between two envelope curves defined by the following two equations:

$$P_T = \frac{-11.5}{C} + 34$$

$$P_T = \frac{-14.3}{C} + 42 + 4C$$

Figure 2:
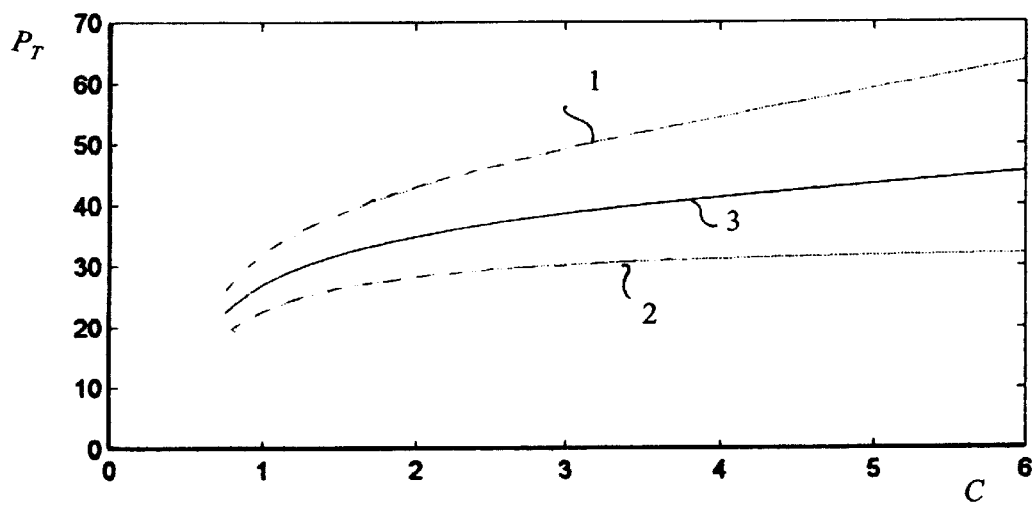
FIG. 2 shows the preferred law of evolution of the degradation threshold as a function of the cylinder to be corrected and two envelope curves for that law.

FIG. 2 shows the two envelope curves 1, 2.

The law of evolution of the degradation threshold $P_T$ as a function of the cylinder C to be corrected preferably satisfies the following equation:

$$P_T = \frac{-12.7}{C} + 38 + 1.6C$$

This law is represented by the curve 3 between the two envelope curves 1, 2 in FIG. 2.

The limiting angular error $\alpha_T$ of the lens is then written:

$$\alpha_T = \arcsin\left[\frac{22.15 - \sqrt{\left(490.6 - \left(\frac{-12.7}{C} + 38 + 1.6C\right)\right)}}{2C}\right]$$

where C is expressed in diopters.

Figure 3:
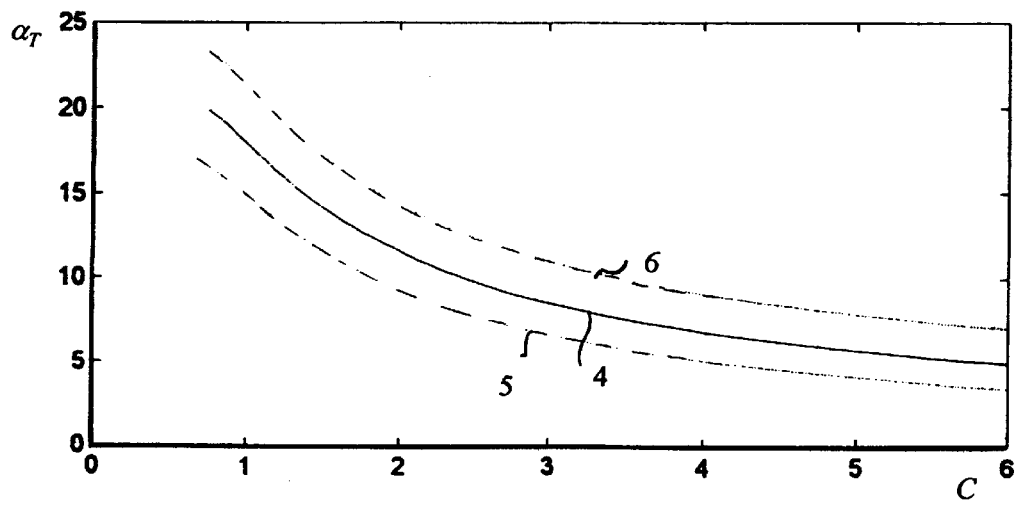
FIG. 3 shows the limiting angular error as a function of the cylinder to be corrected in the case of a variable degradation threshold and two envelope curves for that error.

The curve 4 in FIG. 3 shows this function. The angular error envelope curves are obtained in exactly the same fashion by substituting in the equation expressing the limiting angular error $\alpha_T$ expressions for the evolution threshold $P_T$ corresponding to the two degradation threshold envelope curves 1, 2. The curves 5, 6 in FIG. 3 are the angular error envelope curves.

The limiting angular error $\alpha_T$ can then be determined for each value of the cylinder C to be corrected.

Figure 4:
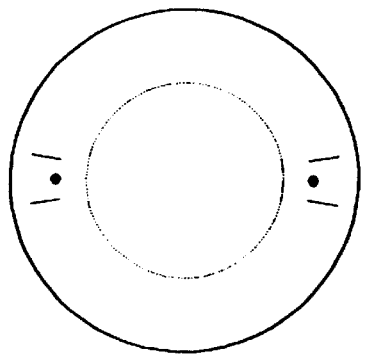
FIG. 4 is a front view of a lens with tolerance markings.

Angular tolerance markings comprising two straight line segments separated by an angle of $2\alpha_T$ are formed in the peripheral area of the lens around an axis corresponding to the theoretical horizontal or vertical axis of the lens. Two symmetrical markings are preferably disposed at diametrally opposite places on the lens. FIG. 4 shows one such arrangement also including two dots showing the theoretical horizontal axis of the lens.

Markings compatible with conventional types of lens are formed on the lens in a manner known to the skilled person, by milling, etching, stamping, excimer laser, coloration or any other conventional method.

Figure 5:
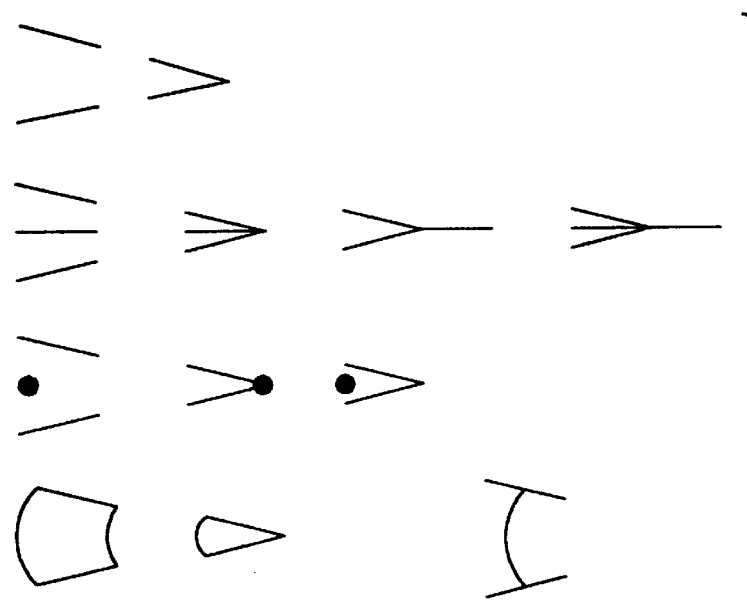
FIG. 5 shows variant markings.
Figure 6:
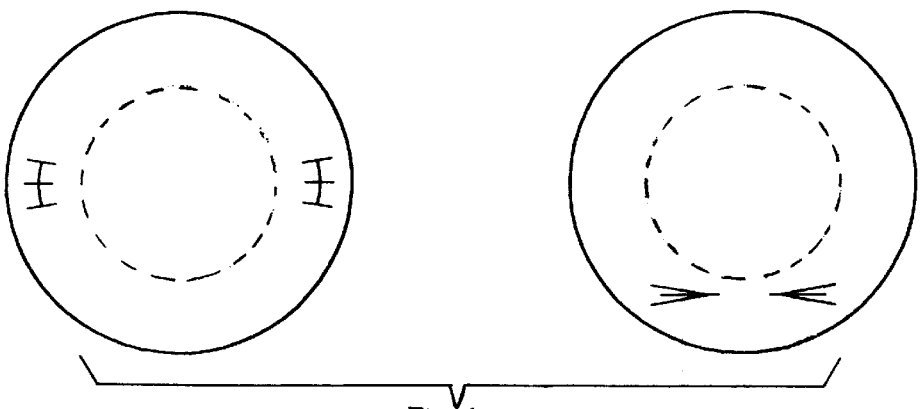
FIG. 6 shows lenses with variant markings.

Many variants of angular tolerance markings can be used that preserve the same characteristic angle, possibly with a middle straight line segment between two other segments or with circular arcs linking the segments. FIG. 5 shows examples of such markings and FIG. 6 shows complete lenses carrying variants of the angular tolerance markings.

Figure 7:
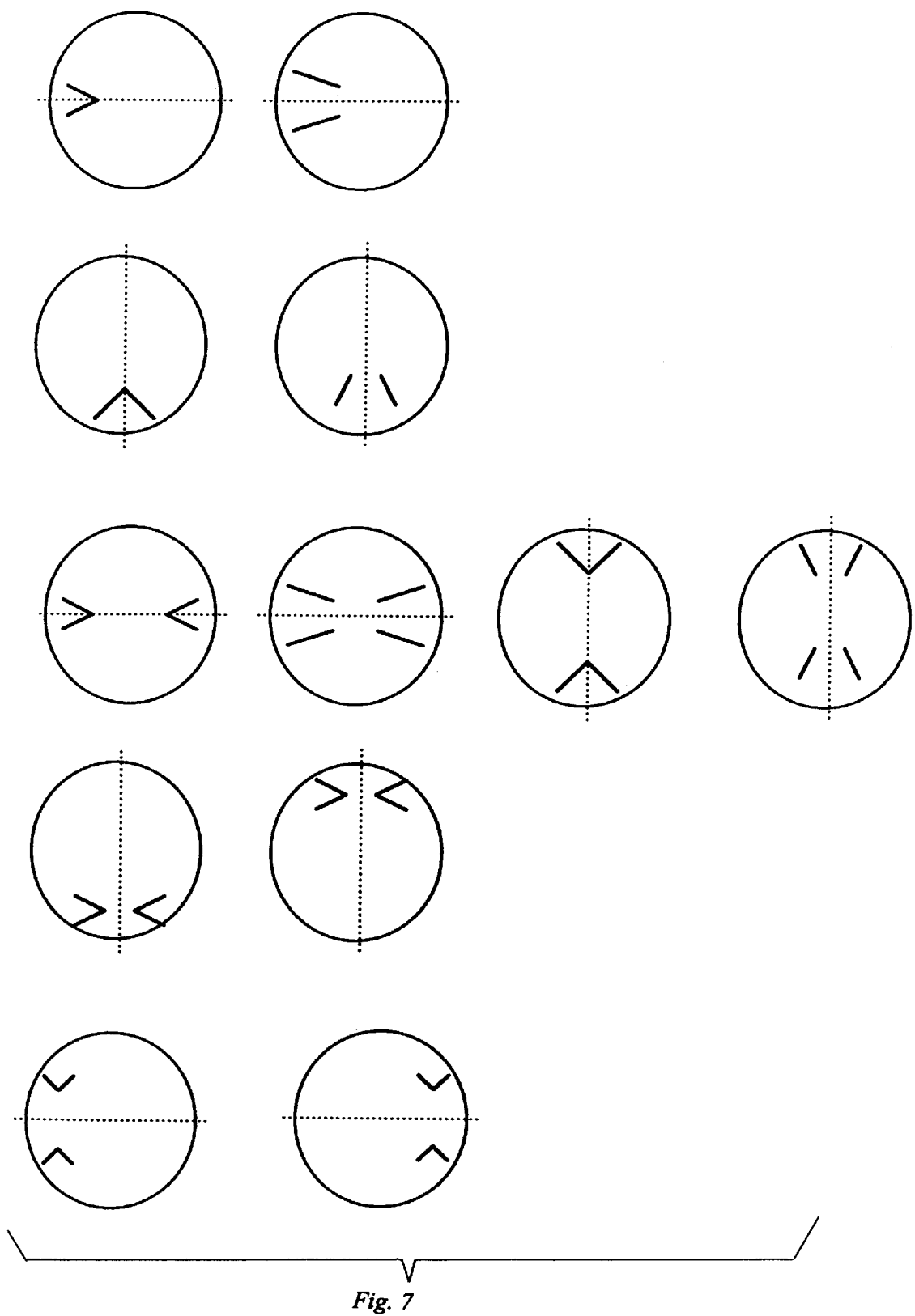
FIG. 7 shows various arrangements of the markings at the periphery of a contact lens.

Similarly, many variants of the disposition of the markings in the peripheral area of the lens can be produced by the same method, and FIG. 7 shows a series of such dispositions.

The present invention is not limited to the details of the embodiments described hereinabove by way of example. In contrast, it encompasses all modifications that may suggest themselves to the skilled person.

There is claimed:

1. A method of producing tolerance markings on a contact lens which has a given cylinder for correcting astigmatism, wherein said tolerance markings comprise at least two straight line segments in the peripheral part of said contact lens with an angle $2\alpha_T$ between them depending on said cylinder of said contact lens.

2. The method claimed in claim 1 wherein an angle $\alpha_T$ equal to half said angle between said two straight line segments of said tolerance markings satisfies the following equation:

$$\alpha_T = \arcsin\left[\frac{22.15\sqrt{(490.6-P_T)}}{2C}\right]$$

where C is said cylinder expressed in diopters and $P_T$ is a threshold of reduced visual acuity to be complied with, expressed as a percentage, and having a value in the range from 10% to 50%.

3. The method claimed in claim 1 wherein an angle $\alpha_T$ equal to half said angle between said two straight line segments of said tolerance markings satisfies the following equation:

$$\alpha_T = \arcsin\left[\frac{22.15\sqrt{(490.6-P_T)}}{2C}\right]$$

where C is said cylinder expressed in diopters and the law of evolution giving said degradation threshold $P_T$ as a function of said cylinder C to be corrected is represented between two envelope curves defined by the following two equations:

$$P_T = \frac{-11.5}{C} + 34$$

$$P_T = \frac{-14.3}{C} + 42 + 4C.$$

4. The method claimed in claim 3 wherein said law of evolution of said degradation threshold $P_T$ as a function of said cylinder C to be corrected satisfies the following equation:

$$P_T = \frac{-12.7}{C} + 38 + 1.6C.$$

5. A contact lens for correcting astigmatism having an optically active central area, at least one surface of which is not circumferentially symmetrical about its optical axis, and a peripheral area including tolerance markings formed by the method claimed in claim 1.

6. A series of lenses each carrying tolerance markings including at least two straight line segments wherein the angle of said straight line segments varies with the cylinder C to be corrected from one lens to another.

7. The series of lenses claimed in claim 6 wherein the angle of said straight line segments decreases as said cylinder C to be corrected increases from one lens to another.

8. The series of lenses claimed in claim 7 wherein an angle $\alpha_T$ equal to half said angle between said two straight line segments of said tolerance markings satisfies the following equation:

$$\alpha_T = \arcsin\left[\frac{22.15 - \sqrt{(490.6-P_T)}}{2C}\right]$$

where C is said cylinder expressed in diopters and $P_T$ is a threshold of reduced visual acuity to be complied with, expressed as a percentage and having a value in the range from 10% to 50%.

9. The series of lenses claimed in claim 7 wherein an angle $\alpha_T$ equal to half said angle between said two straight line segments of said tolerance markings satisfies the following equation:

$$\alpha_T = \arcsin\left[\frac{22.15 - \sqrt{(490.6-P_T)}}{2C}\right]$$

where C is said cylinder expressed in diopters and the law of evolution giving said degradation threshold $P_T$ as a function of said cylinder C to be corrected is represented between two envelope curves defined by the following two equations:

$$P_T = \frac{-11.5}{C} + 34$$

$$P_T = \frac{-14.3}{C} + 42 + 4C.$$

10. The series of lenses claimed in claim 9 wherein said law of evolution of said degradation threshold $P_T$ as a function of said cylinder C to be corrected satisfies the following equation:

$$P_T = \frac{-12.7}{C} + 38 + 1.6C.$$

11. A contact lens for correcting astigmatism, included in the series of lenses claimed in claim 6 and having an optically active central area, at least one surface of which is not circumferentially symmetrical about its optical axis, and a peripheral area.

* * * * *